United States Patent
Back et al.

(10) Patent No.: US 11,905,372 B2
(45) Date of Patent: Feb. 20, 2024

(54) HIGHLY HEAT-RESISTANT AND LOW DIELECTRIC-POLYMIDE FILM AND METHOD FOR PRODUCING SAME

(71) Applicant: PI Advanced Materials Co., Ltd., Chungcheongbuk (KR)

(72) Inventors: Sung-Yul Back, Chungcheongbuk (KR); Min-Sang Cho, Chungcheongbuk (KR); Jin-Seok Jeon, Chungcheongbuk (KR); Ki-Hoon Kim, Chungcheongbuk (KR); Kil-Nam Lee, Chungcheongbuk (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 17/775,185

(22) PCT Filed: Dec. 2, 2019

(86) PCT No.: PCT/KR2019/016848
§ 371 (c)(1),
(2) Date: May 6, 2022

(87) PCT Pub. No.: WO2021/091011
PCT Pub. Date: May 14, 2021

(65) Prior Publication Data
US 2022/0396667 A1    Dec. 15, 2022

(30) Foreign Application Priority Data
Nov. 7, 2019    (KR) .......... 10-2019-0141458

(51) Int. Cl.
| | |
|---|---|
| *C08G 73/10* | (2006.01) |
| *B32B 27/28* | (2006.01) |
| *B32B 27/08* | (2006.01) |
| *C08J 5/18* | (2006.01) |
| *B32B 15/20* | (2006.01) |
| *B32B 15/08* | (2006.01) |
| *B32B 15/18* | (2006.01) |

(52) U.S. Cl.
CPC .......... *C08G 73/1042* (2013.01); *B32B 27/08* (2013.01); *B32B 27/281* (2013.01); *C08G 73/1032* (2013.01); *C08G 73/1067* (2013.01); *C08J 5/18* (2013.01); *B32B 15/08* (2013.01); *B32B 15/18* (2013.01); *B32B 15/20* (2013.01); *B32B 2250/24* (2013.01); *B32B 2307/30* (2013.01); *B32B 2307/7246* (2013.01); *C08J 2379/08* (2013.01)

(58) Field of Classification Search
CPC ............ C08G 73/1042; C08G 73/1032; C08G 73/1067; B32B 27/08; B32B 27/281; B32B 15/08; B32B 15/18; B32B 15/20; B32B 2250/24; B32B 2307/30; B32B 2307/7246; B32B 2307/204; B32B 15/00; C08J 5/18; C08J 2379/08
See application file for complete search history.

(56) References Cited

U.S. PATENT DOCUMENTS

| | | | |
|---|---|---|---|
| 5,202,412 A | 4/1993 | Auman et al. | |
| 2020/0396833 A1* | 12/2020 | Johnson | B32B 27/20 |

FOREIGN PATENT DOCUMENTS

| | | |
|---|---|---|
| CN | 101942280 | 1/2011 |
| JP | 2007162005 | 6/2007 |
| JP | 2008120985 A * | 5/2008 |
| JP | 2013018926 | 1/2013 |
| JP | 2017179150 | 10/2017 |
| KR | 930008023 | 5/1993 |
| KR | 101183320 | 1/2007 |
| KR | 20140114953 | 9/2014 |
| KR | 20150037574 | 4/2015 |
| KR | 20150069318 | 6/2015 |
| KR | 20160127756 | 11/2016 |
| KR | 20190116724 | 10/2019 |
| KR | 20190116725 | 10/2019 |

* cited by examiner

*Primary Examiner* — John D Freeman
(74) *Attorney, Agent, or Firm* — Brooks, Cameron & Huebsch, PLLC

(57) ABSTRACT

Disclosed herein is a polyimide film that is obtained by imidizing a polyamic acid solution containing two or more dianhydride components selected from the group consisting of 3,3',4,4'-benzophenonetetracarboxylic dianhydride (BTDA), 3,3',4,4'-biphenyltetracarboxylic dianhydride (BPDA), and pyromellitic dianhydride (PMDA), and a diamine component including m-tolidine and p-phenylenediamine (PPD) and has a glass transition temperature (Tg) of 320° C. or higher, a moisture absorption rate of 0.4% or less, and a dielectric dissipation factor (Df) of 0.004 or less.

4 Claims, No Drawings

HIGHLY HEAT-RESISTANT AND LOW DIELECTRIC-POLYMIDE FILM AND METHOD FOR PRODUCING SAME

TECHNICAL FIELD

The present disclosure relates to a polyimide film having high heat-resistant, low dielectric, and low hygroscopic properties in combination and a manufacturing method therefor.

BACKGROUND ART

Polyimide (PI), based on highly chemically stable imide rings in a robust aromatic backbone, is a polymeric material that has highest levels of heat resistance, drug resistance, electric insulation, chemical resistance, and weather resistance among organic materials.

Particularly, with their excellent insulation properties (i.e., excellent electric properties such as low dielectric constants), polyimides enjoy applications as high-performance polymers in diverse fields including electric, electronic, and optical fields.

Recently, flexible, thin-film circuit boards with a high degree of integration have been actively developed with the weight reduction and miniaturization of electronics.

Thin-film circuit boards tend to take advantage of a structure in which a circuit including a metal foil is formed on a highly flexible polyimide film with excellent heat resistance, low-temperature resistance, and insulation properties.

In such thin-film circuit boards, flexible metal-clad laminates predominate, as exemplified by a flexible copper clad laminate (FCCL) in which a thin copper sheet is used as a metal foil. In this regard, polyimide is employed as a protection film, an insulation film, and so on in thin film circuit boards.

With the installation of various functions therein, electronic devices have recently been required to have fast calculation and communication speeds. To meet this requirement, development has been made of thin-film circuit boards that enable high-speed communication at a high frequency.

As for general polyimides, however, their dielectric properties fall short of a level excellent enough to maintain sufficient insulation in high-frequency communication.

In addition, it has been reported that insulators with lower dielectric properties are more likely to reduce undesired stray capacitance and noise generation in a thin-film circuit board, thereby significantly removing causes of communication latency.

Accordingly, a polyimide with low-dielectric properties is now accepted as an important factor above all else in the performance of a thin-film circuit board.

In the case of high-frequency communication, dielectric dissipation through polyimide inevitably occurs. Since dielectric dissipation factor (Df), which is a degree of electrical energy loss in a thin-film circuit board, closely correlates with the signal propagation delay that determines a communication speed, maintenance of the dielectric dissipation factor at as low a level as possible is recognized as an important factor for the performance of a thin-film circuit board.

A polyimide film with a higher moisture content therein is more apt to increase in dielectric constant and dielectric dissipation factor. With excellent intrinsic properties, polyimide films are suitable as materials for thin-film circuit boards. However, polyimide films may be relatively vulnerable to moisture due to the imide groups with polarity and as such, may have decreased in insulation properties.

Therefore, there is a need for developing a polyimide film that retains certain levels of characteristic mechanical, thermal, and anti-chemical properties thereof and shows dielectric properties, particularly, a low-dielectric dissipation factor.

DISCLOSURE

Technical Problem

Provided to solve the problems are a polyimide film having high heat-resistance, low dielectric, and low hygroscopic properties in combination and a manufacturing method therefor.

To this end, the present disclosure substantially aims to provide exemplary embodiments.

Technical Solution

To accomplish the aims, an aspect of the present disclosure provides a polyimide film, obtained by imidizing a polyamic acid solution containing two or more dianhydride components selected from the group consisting of 3,3',4,4'-benzophenonetetracarboxylic dianhydride (BTDA), 3,3',4,4'-biphenyltetracarboxylic dianhydride (BPDA), and pyromellitic dianhydride (PMDA), and a diamine component including m-tolidine and para-phenylenediamine (p-phenylenediamine, PPD), wherein the m-tolidine is used at a content of 20% by mole to 40% by mole and the p-phenylenediamine is used at a content of 60% by mole to 80% by mole, based on a total of 100% by mole of the diamine component.

Based on a total of 100% by mole of the dianhydride component, 3,3',4,4'-benzophenonetetracarboxylic dianhydride may be used at a content of 10% by mole to 40% by mole and 3,3',4,4'-biphenyltetracarboxylic dianhydride may be used at a content of 30% by mole to 80% by mole.

In addition, the polyimide film may include a block copolymer composed of two or more blocks.

That is to say, the polyimide film may include a block copolymer comprising a first block obtained by imidizing a dianhydride component including 3,3',4,4'-benzophenonetetracarboxylic dianhydride and 3,3',4,4'-biphenyltetracarboxylic dianhydride with diamine component including p-phenylenediamine; and a second block obtained by imidizing a dianhydride component including pyromellitic dianhydride with a diamine component including m-tolidine.

The polyimide film may have a glass transition temperature (Tg) of 320° C. or higher, a moisture absorption rate of 0.4% or less, and a dielectric dissipation factor (Df) of 0.004 or less.

Another aspect of the present disclosure provides a method for manufacturing a polyimide film, the method comprising the steps of:

(a) polymerizing a first dianhydride component and a first diamine component in an organic solvent to prepare a first polyamic acid;

(b) polymerizing a second dianhydride component and a second diamine component in an organic solvent to prepare a second polyamic acid;

(c) polymerizing the first polyamic acid and the second polyamic acid in an organic solvent to prepare a third polyamic acid; and (d) forming a precursor composition containing the third polyamic acid into a film on a support, followed by imidization, wherein the first dianhydride component and the second dianhydride component each comprise at least two selected from the group consisting of 3,3',4,4'-benzophenonetetracarboxylic dianhydride (BTDA), 3,3',4,4'-biphenyltetracarboxylic dianhydride (BPDA), and pyromellitic dianhydride (PMDA), and the first diamine component and the second diamine component each comprise at least one selected from the group consisting of m-tolidine and p-phenylenediamine (PPD).

Advantageous Effects

As stated in the foregoing, the polyimide film comprising specific components at specific ratios, manufactured by the method of the present disclosure, exhibits high heatresistance, low dielectric, and low hygroscopic properties in combination, thus finding applications in various fields demanding such properties, especially, electronic parts such as flexible metal-clad laminates, etc.

BEST MODE FOR CARRYING OUT THE INVENTION

Below, a detailed description will be given of the present disclosure in the order of "polyimide film" and "method for manufacturing a polyimide film".

Terms and words used in the present specification and claims should not be limited to general or dictionary meanings, but are to be construed as meaning and concepts meeting the technical ideas of the present disclosure based on a principle that the present inventors may appropriately define the concepts of terms in order to describe their inventions in the best mode.

Therefore, the configurations of embodiments described herein are only one of the most preferred embodiments of the present disclosure and do not represent all the technical spirits of the present disclosure. Thus, it should be understood that there may be various equivalents and modification examples that can replace them at the time of filing the present application.

Singular forms as used herein include plural forms unless the context clearly indicates otherwise. It should be understood that the term "comprise", "includes", or "have", etc., as used herein specifies the presence of implemented features, numerals, steps, components, or a combination thereof, but does not preclude the presence or addition of one or more other features, numerals, steps, components, or a combination thereof.

It should be understood that when an amount, concentration, or other value or parameter as used herein is given as an enumeration of a range, a preferable range, or preferable upper and lower values, all ranges formed with any upper limit or preferable values of any one pair and any lower limit or preferable values of any one pair are specifically disclosed, regardless of whether the range is disclosed separately.

When a range of numerical values is referred to herein, the range is intended to include endpoints thereof and all integers and fractions within that range, unless stated otherwise. It is intended that the scope of the present disclosure is not limited to specific values recited when the range is defined.

As used herein, the term "dianhydride" is intended to encompass precursors or derivatives thereof which may not fall within the scope of dianhydrides from a point of technical view, but nevertheless will react with diamine to form polyamic acids which can be then converted into polyimides.

As used herein, the term "diamine" is intended to encompass precursors or derivatives thereof which may not fall within the scope of diamines from a point of technical view, but nevertheless will react with dianhydride to form polyamic acids which can be then converted into polyimides.

The polyimide film according to the present disclosure is obtained by imidizing a polyamic acid solution containing a dianhydride component inclusive of at least two selected from the group consisting of 3,3',4,4'-benzophenonetetracarboxylic dianhydride (BTDA), 3,3',4,4'-biphenyltetracarboxylic dianhydride (BPDA), and pyromellitic dianhydride (PMDA) and a diamine component composed of m-tolidine and p-phenylenediamine (PPD), wherein m-tolidine and p-phenylene diamine are used at a content of 20 to 40% by mole and 60 to 80% by mole, respectively, based on a total of 100% by mole of the diamine component.

In some particular embodiments, the content of m-tolidine is in the range of 30 to 40% by mole. Having methyl groups, which are hydrophobic, m-tolidine contributes to the low hygroscopic property of the polyimide film.

In addition, 3,3',4,4'-benzophenonetetracarboxylic dianhydride and 3,3',4,4'-biphenyltetracarboxylic dianhydride may be used at a content of 10 to 40% by moles and 30 to 80% by mole, respectively, based on a total of 100% by mole of the dianhydride component.

In some particular embodiments, the content of 3,3',4,4'-benzophenonetetracarboxylic dianhydride may be in the range of to 35% by mole and the content of 3,3',4,4'-biphenyltetracarboxylic dianhydride is in the range of 35 to 75% by mole.

Pyromellitic dianhydride may be contained in an amount of 50% by mole or less, based on a total of 100% by mole of the dianhydride component, and may not be contained at all.

In the present disclosure, the polyimide chain derived from 3,3',4,4'-biphenyltetracarboxylic dianhydride has the structure of so-called charge transfer complex (CTC), that is, an ordered linear structure in which electron donors and electron acceptors are positioned in proximity to each other, with an intermolecular interaction enhanced therebetween.

Like 3,3',4,4'-biphenyltetracarboxylic dianhydride, 3,3',4,4'-benzophenonetetracarboxylic dianhydride, which bears carbonyl groups, also makes a contribution to the development of CTC.

Being effective of preventing the formation of hydrogen bonds with moisture, such a structure has a decreasing influence on moisture absorption rate and as such, can bring about a maximum effect of decreasing the hygroscopic property of the polyimide film.

In some particular embodiments, the polyamic acid solution may further contain pyromellitic dianhydride as a dianhydride component. As a dianhydride component with a relatively stout structure, pyromellitic dianhydride may be preferred due to conferring proper resilience on the polyimide film.

For the polyimide film to meet pertinence in terms of both resilience and moisture absorption rate, the content ratio of the dianhydrides is particularly important. For instance, a lower content ratio of 3,3',4,4'-biphenyltetracarboxylic dianhydride makes it more difficult to achieve a low moisture absorption rate due to the CTC structure.

The aromatic moiety of the dianhydride component is accounted for by two benzene rings in each of 3,3',4,4'-biphenyltetracarboxylic dianhydride and 3,3',4,4'-benzophenonetetracarboxylic dianhydride, but by one benzene ring in pyromellitic dianhydride.

the dianhydride component, an increase in the content of pyromellitic dianhydride is construed to be an increase in the number of imide groups within the molecule in view of the same molecular weight, indicating that the proportion of the imide group derived from pyromellitic dianhydride in the polyimide chain is relatively increased, compared to that of the imide group derived from 3,3',4,4'-biphenyltetracarboxylic dianhydride and 3,3',4,4'-benzophenonetetracarboxylic dianhydride.

Accordingly, an increased content of pyromellitic dianhydride is understood as a relative increase of the imide group in the entire polyimide film, too, leading to difficulty in expecting low moisture absorption rates.

In contrast, a reduced content of pyromellitic dianhydride accounts for a relative reduction in a component responsible for the stout structure and thus may decrease the mechanical properties of the polyimide to an undesirable level.

For this reason, when contents of 3,3',4,4'-biphenyltetracarboxylic dianhydride and 3,3',4,4'-benzophenonetetracarboxylic dianhydride exceed the upper limits of the ranges set forth above therefor, the polyimide film has degraded mechanical properties and cannot attain heat resistance at a level sufficient to manufacture a flexible metal clad laminate.

When 3,3',4,4'-biphenyltetracarboxylic dianhydride and 3,3',4,4'-benzophenonetetracarboxylic are used at contents lower than the lower limits of the ranges set respectively forth therefor or when pyromellitic dianhydride is used at a content higher than the upper limit of the range set forth therefor, the polyimide film cannot achieve proper levels of dielectric constant, dielectric dissipation factor, and moisture absorption rate.

The polyimide film may a block copolymer composed of two or more blocks and particularly two blocks.

The two blocks may be a first block obtained by imidizing a dianhydride component including 3,3',4,4'-benzophenonetetracarboxylic dianhydride and 3,3',4,4'-biphenyltetracarboxylic dianhydride and a diamine component including p-phenylenediamine; and a second block obtained by imidizing a dianhydride component including pyromellitic dianhydride and a diamine component including m-tolidine.

The polyimide film may have a glass transition temperature (Tg) of 320° C. or higher, a moisture absorption rate of 0.4% or less, and a dielectric dissipation factor (Df) of 0.004 or less.

In this regard, not only can the polyimide film meeting all the dielectric dissipation factor (Df), the glass transition temperature, and the moisture absorption rate be used as an insulation film for flexible metal clad laminates, but also the flexible metal clad laminates prepared therewith can guarantee insulation stability and minimize signal propagation delay even when they are used in electrical signal transfer circuits for transferring signals at a frequency of 10 GHz or higher.

A polyimide film that meets the conditions set in the foregoing has not yet been known. Below, dielectric dissipation factor (DF) and moisture absorption rate will be elucidated in detail.

<Dielectric Dissipation Factor>

As used herein, the term "dielectric dissipation factor" means the degree of electrical energy loss by a dielectric substance (or insulator) as a result of the change of the electrical energy in the insulator to heat energy by vibration of the molecules when an alternating current field is applied thereto.

A value of dielectric dissipation factor is an index of the easiness of charge loss (dielectric loss) and is typically used as a standard for the degree of electrical loss. With a higher dielectric dissipation factor, an insulator is more prone to losing charges. On the other hand, the lower the dielectric dissipation factor is, the less the charges are likely to lose. That is, the dielectric dissipation factor explains how much electrical loss occurs. Thus, given a low dielectric dissipation factor, the signal propagation delay attributable to electrical energy loss is relieved, with the resultant maintenance of a fast communication speed.

This condition is strongly demanded for a polyimide film used as an insulation film. The polyimide film according to the present disclosure may have a dielectric dissipation factor of 0.004 or less under a very high frequency, such as 10 GHz.

<Moisture Absorption Rate>

The moisture absorption rate is a ratio of the moisture contained in a material. As a rule, a high moisture absorption rate is known to lead to an increase in dielectric constant and dielectric dissipation factor.

Water has a dielectric constant of 100 or higher in the solid state, about 80 in the liquid state, and 1.0059 in the vapor state.

That is, after being absorbed into a polyimide film, water vapor exists in a liquid state, thereby exceptionally increasing the dielectric constant and dielectric dissipation factor of the polyimide film.

Even a trace amount of water, if absorbed, can greatly change the dielectric constant and dielectric dissipation factor in the polyimide film.

The polyimide film according to the present disclosure may have a moisture absorption rate of 0.4% by weight. The attainment of such a low moisture absorption rate is attributed to the configurational characteristics of the polyimide film according to the present disclosure.

As will be in detail elucidated, the non-polar moiety in the molecular structure of the polyimide film according to the present disclosure is considered to be responsible for the low moisture absorption rate.

As stated in the foregoing, the polyimide film according to the present disclosure satisfies all the conditions set forth above and as such, cannot only be used as an insulation film for flexible metal clad laminates, but also can guarantee insulation stability and minimize signal propagation delay even at a high frequency.

In the present disclosure, the preparation of a polyamic acid may be achieved by (1) a method in which polymerization is carried out by adding the entire amount of a diamine component to a solvent and then a substantially equimolar amount of a dianhydride component, (2) a method in which the polymerization is carried out by adding the entire amount of a dianhydride component to a solvent and then a substantially equimolar amount of a diamine component, (3) a method in which the polymerization is carried out by: adding some of a diamine component to a solvent; mixing some of a dianhydride component at a ratio of about 95-105% by mole relative to the reaction component; and adding the residual diamine component and subsequently the residual dianhydride component to make the respective amounts the diamine component and the dianhydride component substantially equimolar, (4) a method in which the polymerization is carried out by: adding a dianhydride component to an organic solvent; mixing some of a diamine component at a ratio of 95-105% by mole relative to the reaction component; and adding a different dianhydride component and subsequently the residual diamine component to make a total of the amounts of the dianhydride components substantially equimolar to the total amount of the diamine component, or (5) a method in which the polymerization is carried out by: reacting some of a diamine component with some of a dianhydride component in a solvent where any one of the diamine component and the dianhydride component is used in excess to form a first composition; reacting some of the diamine component with some of the dianhydride component in a different solvent where any one of the diamine component and the dianhydride component is used in excess to form a second composition; and mixing the first and the second composition, wherein when the first composition is formed by using the diamine component in excess, the second composition is formed by using the dianhydride in excess or when the first composition is formed by using the dianhydride component in excess, the second composition is formed by using the diamine component in excess, whereby the total amount of the diamine component is substantially equimolar to the total amount of the dianhydride component.

However, the polymerization method is not limited to those given above, the first to the third polyamic acid may be prepared using any method known in the art.

In an embodiment, the method for manufacturing a polyimide film according to the present disclosure comprises the steps of:

(a) polymerizing a first dianhydride component with a first diamine component in an organic solvent to prepare a first polyamic acid;
(b) polymerizing a second dianhydride component with a second diamine component in an organic solvent to prepare a second polyamic acid;
(c) polymerizing the first polyamic acid with the second polyamic acid in an organic solvent to prepare a third polyamic acid; and
(d) forming a precursor composition including the third polyamic acid into a film on a support, followed by imidization, wherein, the first dianhydride component and the second dianhydride component each include at least two selected from the group consisting of 3,3',4,4'-benzophenonetetracarboxylic dianhydride (BTDA), 3,3',4,4'-biphenyltetracarboxylic dianhydride (BPDA), and pyromellitic dianhydride (PMDA), and the first diamine component and the second diamine component each include at least one selected from the group consisting of m-tolidine and p-phenylenediamine (PPD).

Based on a total of 100% by mole of the first diamine component and the second diamine component, m-tolidine and p-phenylene diamine may be used at a content of 20 to 40% by mole and 60 to 80% by mole, respectively.

Based on a total of 100% by mole of the first dianhydride component and the second dianhydride component, 3,3',4, 4'-benzophenonetetracarboxylic dianhydride and 3,3',4,4'-biphenyltetracarboxylic dianhydride may be used at a content of 10 to 40% by mole and 30 to 80% by mole, respectively.

In some particular embodiments, the first polyamic acid may comprise 3,3',4,4'-benzophenonetetracarboxylic dianhydride and 3,3',4,4'-biphenyltetracarboxylic dianhydride as dianhydride components and p-phenylenediamine as a diamine component while the second polyamic acid may comprise pyromellitic dianhydride as a dianhydride component and m-tolidine as a diamine component.

In the present disclosure, the polymerization methods for polyamic acid stated above is defined as random polymerization methods. The polyimide film manufactured from the polyamic acid prepared in the aforementioned processes may be preferably applied in light of maximizing the present disclosure's effect of decreasing dielectric dissipation factor (Df) and moisture absorption rate in the polyimide film.

However, the polymer chains prepared by the polymerization methods described in the foregoing have relatively short repeating units and thus are insufficient to exhibit excellent properties that the polyimide chains derived from dianhydride component retain. Preferably available in the present disclosure may thus be a block polymerization method.

So long as it can dissolve polyamic acid, any solvent for use in polyamic acid synthesis can be used without limitations. Preferred is an amide-based solvent.

In detail, the solvent may be an organic polar solvent, particularly a polar aprotic solvent. For example, the solvent may be at least one selected from the group consisting of N,N-dimethylformamide (DMF), N,Ndimethylacetamide, N-methyl-pyrrolidone (NMP), gamma butyrolactone (GBL), and diglyme, but with no limitations thereto. The solvents may be used alone or in combination, as necessary.

In particular some embodiments, the solvent may include N,N-dimethyformamide and N,N-dimethylacetamide.

Moreover, with the aim of enhancing various properties of the film, such as slidability, thermal conductivity, corona resistance, loop hardness, etc., a filler may be added in the polyamic acid preparation processes. Particular limitations are not imparted to the filler added. Examples of the filler include silica, titanium oxide, alumina, silicon nitride, calcium hydrogen phosphate, calcium phosphate, and mica.

The particle diameter of the filler is not particularly limited, but is determined according to desirable properties of the film and types of the filler to be added. Generally, the filler has a mean particle diameter of 0.05 to 100 µm, particularly 0.1 to 75 µm, more particularly 0.1 to 50 µm, even more particularly 0.1 to 25 µm.

When fillers have a particle diameter less than the lower limit of the range, modification effects thereof are little obtained. With a particle diameter exceeding the upper limit of the range, the fillers may greatly degrade the surface property or mechanical property.

The amount of the filler is not particularly limited, but may be determined according to desirable properties of the film and particle sizes of the filler. Generally, the filler is used in an amount of 100 0.01 to 100 parts by weight, particularly 0.01 to 90 parts by weight, and more particularly 0.02 to 80 parts by weight, based on 100 parts by weight of the polyimide film.

When the filler is used in an amount less than the lower limit of the range, modification effects thereof are little obtained. When used in an amount higher than the upper limit of the range, the filler is apt to greatly damage mechanical properties of the film. So long as it is known in the art, any method of adding the filler may be used without particular limitations.

The polyimide film of the present disclosure may be manufactured using a thermal imidization process or a chemical imidization process.

In addition, a composite imidization process in which thermal imidization and chemical imidization are conducted in combination may be used to manufacture the polyimide film.

As used herein, the term "thermal imidization" refers to a process in which an imidization reaction is induced using a heat source, such as hot wind or an infrared dryer, without a chemical catalyst.

According to a thermal imidization process, the gel film is thermally treated at temperatures varying from 100 to 600° C. to imidize amic acid groups present in the gel film, particularly at temperatures from 200 to 500° C., and more particularly at temperatures from 300 to 500° C.

During the formation of the gel film, the amic acid groups may be imidized in part (about 0.1 to 10% by mole). In this regard, the polyamic acid composition may be dried at temperatures varying from 50° C. to 200° C. This process may also fall within the scope of the thermal imidization process.

For a chemical imidization process for manufacture of a polyimide film, a dehydrating agent and an imidizing agent are employed according to a method known in the art.

In an example of the composite imidization process, a polyamic acid solution is partially cured and dried by thermal treatment at 80 to 200° C. and particularly at 100 to 180° in the presence of a dehydrating agent and an imidizing agent and then heated at 200 to 400° C. for 5 to 400 seconds to afford a polyimide film.

The polyimide film manufactured according to the method of the present disclosure may have a glass transition temperature (Tg) of 320° C. or higher, a moisture absorption rate of 0.4% or less, and a dielectric dissipation factor (Df) of 0.004 or less.

The present disclosure provides a multilayer film comprising the polyimide film and a thermoplastic resin layer, and a flexible metal clad laminate comprising the polyimide film and an electrically conductive metal foil.

As the thermoplastic resin layer, for example, a thermoplastic polyimide resin layer may be available.

No particular limitations are imparted to the metal foil used. For use in the flexible metal clad laminate of the present disclosure which is applied to electronic or electric devices, the metal foil may include, for example, copper or a copper alloy, stainless steel or an alloy thereof, nickel or nickel alloy (inclusive of 42 alloy), or aluminum or an aluminum alloy.

Flexible metal clad laminates usually employ copper foil such as rolled copper foil, electrolytic copper foil, etc. In this disclosure, copper foil may also be employed. In addition, the copper foil may be coated with an anti-corrosive layer, a heat resistance layer, or an adhesive layer.

In the present disclosure, the metal foil is not limited to particular thicknesses, but may be thick enough to exhibit a sufficient performance according to its use.

The flexible metal clad laminate according to the present disclosure may have a structure in which a metal foil is laminated on one surface of the polyimide film or on a thermoplastic polyimide-containing adhesive layer attached to one surface of the polyimide film.

Also, the present disclosure provides an electronic part comprising the flexible metal clad laminate as an electrical signal transfer circuit. The electrical signal transfer circuit may transfer signals at a frequency of at least 2 GHz, particularly at least at a frequency of at least 5 GHz, and more particularly at a frequency of at least 10 GHz.

The electronic part may include, for example, a communication circuit for mobile terminals, computers, and aerospace flights, but is not limited thereto.

MODE FOR CARRYING OUT THE INVENTION

Below, a better understanding of the present disclosure may be obtained via the following examples which are set forth to illustrate, but are not to be construed as limiting, the present disclosure.

EXAMPLE 1

To a 500-ml reactor equipped with a stirrer and nitrogen introduction/release tubes was input NMP while introducing nitrogen thereto. After the temperature of the reactor was set to be 30° C., p-phenylenediamine as a diamine component and 3,3',4,4'-benzophenonetetracarboxylic dianhydride and 3,3',4,4'-biphenyltetracarboxylic dianhydride as dianhydride components were input. After being observed to be completely dissolved, the components were stirred for 120 minutes in a nitrogen atmosphere, while heating to 40° C., to afford a first polyamic acid having a viscosity of 200,000 cp at 23° C.

To a 500-ml reactor equipped with a stirrer and nitrogen introduction/release tubes was input NMP while introducing nitrogen thereto. After the temperature of the reactor was set to be 30° C., m-tolidine, dianhydride as a diamine component and m-tolidine as a dianhydride component were input. After being observed to be completely dissolved, the components were stirred for 120 minutes in a nitrogen atmosphere, while heating to 40° C., to afford a first polyamic acid having a viscosity of 200,000 cp at 23° C.

Afterward, the first polyamic acid and the second polyamic acid were stirred together for 120 minutes in a nitrogen atmosphere, while heating to 40° C., afford a third polyamic acid having a viscosity of 200,000 cP at 23° C. and containing diamine components and dianhydride components as shown in Table 1, below.

From the third polyamic acid obtained above, gas was removed by rotating at 1,500 rpm or higher. Then, the degassed polyimide precursor composition was applied to a grass substrate, using a coater, followed by drying at 120° C. for 30 minutes in a nitrogen atmosphere to prepare a gel film. The gel film was heated to 450° C. at an elevation speed of 2° C./min, treated at 450° C. for 60 minutes, and then cooled to 30° C. at a speed of 2° C./min to afford a polyimide film.

Subsequently, the polyimide film was released from the glass substrate by dipping into distilled water. The polyimide film thus manufactured was 15 μm thick as measured by an electric Film thickness tester (Anritsu)

EXAMPLES 2 TO 4 AND COMPARATIVE EXAMPLES 1 TO 7

Polyimide films were manufactured in the same manner as in Example 1, with the exception that the components and contents thereof were changed as shown in Table 1, below. In Table 1, ODA stands for oxydianiline.

TABLE 1

| | Dianhydride component (mol %) | | | Diamine component (mol %) | | | Polyamic acid Polymerization Mode |
|---|---|---|---|---|---|---|---|
| | BPDA (mol %) | BTDA (mol %) | PMDA (mol %) | m-Tolidine (mol %) | PPD (mol %) | ODA (mol %) | |
| Ex. 1 | 75 | 25 | — | 30 | 70 | — | Block |
| Ex. 2 | 50 | 17 | 33 | 30 | 70 | — | Polymerization |
| Ex. 3 | 35 | 17 | 48 | 30 | 70 | — | |
| Ex. 4 | 35 | 32 | 33 | 30 | 70 | — | |
| C. Ex. 1 | — | 100 | — | — | 100 | — | |
| C. Ex. 2 | 100 | — | — | — | 100 | — | |
| C. Ex. 3 | 60 | — | 40 | 70 | 15 | 15 | |
| C. Ex. 4 | — | — | 100 | — | 100 | — | |
| C. Ex. 5 | 50 | 50 | — | — | 100 | — | |
| C. Ex. 6 | 35 | 32 | 33 | — | 70 | 30 | |
| C. Ex. 7 | 25 | 75 | — | — | 100 | — | |

TEST EXAMPLE 1

Assay for Dielectric Dissipation Factor, Glass Transition Temperature, and Moisture Absorption Rate Each of the polyimide films manufactured in Examples 1 to 4 and Comparative Examples 1 to 7 was measured for dielectric dissipation factor and glass transition temperature, and the results are summarized in Table 2, below.

(1) Measurement of Dielectric Dissipation Factor

After the flexible metal clad laminates were left for 72 hours, the dielectric dissipation factor (Df) was measured using the impedance analyzer Agilent 4294A.

(2) Measurement of Glass Transition Temperature

Each film was measured for loss modulus and storage modulus, using DMA. An inflection point on a tangent curve of the loss modulus to the storage modulus was referred to as the glass transition temperature ($T_g$) for the film.

(3) Measurement of Moisture Absorption Rate

A moisture absorption rate was measured according ASTMD 570. In this regard, a specimen was made by cutting the polyimide film into a square dimension of 5 cm×5 cm and dried for 24 hours in an oven maintained at 50° C. before being weighed. Then, the specimen was immersed in water at 23° C. for 24 hours and weighed. The difference in weight was expressed as %.

TABLE 2

| | Df | Tg(° C.) |
|---|---|---|
| Ex. 1 | 0.0027 | 320 |
| Ex. 2 | 0.0033 | 320 |
| Ex. 3 | 0.0038 | 368 |
| Ex. 4 | 0.0034 | 350 |
| C. Ex. 1 | 0.0200 | 410 |
| C. Ex. 2 | 0.0067 | 310 |
| C. Ex. 3 | 0.0035 | 310 |
| C. Ex. 4 | 0.0180 | 450 |
| C. Ex. 5 | 0.0054 | 330 |
| C. Ex. 6 | 0.0069 | 340 |
| C. Ex. 7 | 0.0094 | 360 |

As seen in Table 2, all of the polyimide films manufactured in the Examples of the present disclosure exhibited significantly low dielectric dissipation rates of less than 0.004, with desirable levels of glass transition temperature given thereto.

In addition, the films were all measured to have a moisture absorption rate of 0.4% by weight or less.

It is understood that the results are attributed to the components and composition ratios specified in this disclosure and contents of individual components play critical roles.

On the other hand, the polyimide films of Comparative Examples 1 to 7 which are different in component from the Examples were measured to have a higher die electric dissipation factor or a lower glass transition temperature than those of the Examples. Therefore, the polyimide films of Comparative Examples are predicted to be difficult to use in electronic parts in which signal transmission is performed at a high frequency in gigabytes.

Although the present disclosure has been described with reference to the embodiments thereof, it should be understood by those skilled in the art that various applications and modifications may be made without departing from the scope of the present disclosure.

INDUSTRIAL APPLICABILITY

The present disclosure provides a polyimide film composed of specific compositions of specific components and a manufacturing method therefor. With high heat resistance, low dielectric, and low hygroscopic properties in combination, the polyimide can find advantageous applications in various fields demanding such properties, especially electronic parts such as flexible metal clad laminates, etc.

The invention claimed is:

1. A polyimide film, including a block copolymer comprising:
  a first block obtained by imidizing a dianhydride component consisting of 3,3',4,4'-benzophenonetetracarboxylic dianhydride and 3,3',4,4'-biphenyltetracarboxylic dianhydride with diamine component consisting p-phenylenediamine, and
  a second block obtained by imidizing a dianhydride component consisting of pyromellitic dianhydride with a diamine component consisting of m-tolidine,
  wherein the 3,3',4,4'-benzophenonetetracarboxylic dianhydride is used at a content of 15% by mole to 35% by mole and the 3,3',4,4'-biphenyltetracarboxylic dianhydride is used at a content of 35% by mole to 75% by mole, based on a total of 100% by mole of the dianhydride component in the first block and the second block,
  wherein the m-tolidine is used at a content of 20% by mole to 40% by mole and the p-phenylenediamine is used at a content of 60% by mole to 80% by mole, based on a total of 100% by mole of the diamine component in the first block and the second block,
  wherein a glass transition temperature (Tg) of 320° C. or higher, a moisture absorption rate measured by the ASTM D570 test method is 0.4 wt % or less, and a dielectric dissipation factor (Df) of 0.004 or less at a frequency of 10 GHz.

2. The polyimide film of claim 1, wherein the polyimide is the block copolymer composed of two or more blocks.

3. A method for manufacturing a polyimide film, the method comprising the steps of:

(a) polymerizing a first dianhydride component and a first diamine component in an organic solvent to prepare a first polyamic acid;
(b) polymerizing a second dianhydride component and a second diamine component in an organic solvent to prepare a second polyamic acid;
(c) polymerizing the first polyamic acid and the second polyamic acid in an organic solvent to prepare a third polyamic acid; and
(d) forming a precursor composition containing the third polyamic acid into a film on a support, followed by imidization,
wherein the first polyamic acid comprises a dianhydride component consisting of 3,3',4,4'-benzophenonetetracarboxylic dianhydride and 3,3',4,4'-biphenyltetracarboxylic dianhydride, and a diamine component consisting of p-phenylenediamine, and
the second polyamic acid comprises a dianhydride consisting of pyromellitic dianhydride and a diamine component consisting of m-tolidine, Wherein the 3,3',4,4'-benzophenonetetracarboxylic dianhydride is used at a content of 15% by mole to 35% by mole and the 3,3',4,4'-biphenyltetracarboxylic dianhydride is used at a content of 35% by mole to 75% by mole, based on a total of 100% by mole of the first dianhydride component and the second dianhydride component,
wherein the m-tolidine is used at a content of 20% by mole to 40% by mole and the p-phenylenediamine is used at a content of 60% by mole to 80% by mole, based on a total of 100% by mole of the first diamine component and the second diamine component,
wherein a glass transition temperature (Tg) of 320° C. or higher, a moisture absorption rate measured by the ASTM D570 test method is 0.4 wt % or less, and a dielectric dissipation factor (Df) of 0.004 or less at a frequency of 10 GHz.

4. A multilayer film, comprising the polyimide film of claim 1 and a thermoplastic resin layer.

* * * * *